United States Patent Office 3,505,349
Patented Apr. 7, 1970

3,505,349
2-NITRO-IMIDAZOLYL-1-ACETAMIDES
Alden Gamaliel Beaman, North Caldwell, Robert Duschinsky, Montclair, N.J., and William Paul Tautz, New York, N.Y., assignors to Hoffmann-La Roche Inc., Nutley, N.J., a corporation of New Jersey
No Drawing. Continuation-in-part of application Ser. No. 447,103, Apr. 9, 1965. This application Apr. 18, 1966, Ser. No. 543,066
Int. Cl. C07d 49/36
U.S. Cl. 260—309          9 Claims

ABSTRACT OF THE DISCLOSURE 2-nitroimidazoles substituted in the 1-position with a mono- or di-lower alkyl acetic acid amide which are useful as germicides, antiprotozoal agents and as agents for treatment of pathogenic yeast infections.

Cross reference to related applications

This application is a continuation-in-part of Ser. No. 447,103, filed Apr. 9, 1965, now abandoned.

This application relates to novel 2 - nitroimidazoles. More particularly, the invention relates to substituted 2-nitroimidazoles of the formula

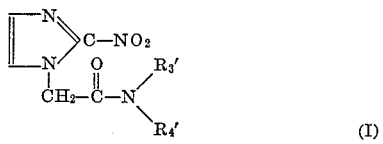

wherein $R_3'$ is hydrogen and lower alkyl and $R_4'$ is lower alkyl.

The term "lower alkyl" as used throughout this specification denotes both straight chain and branched chain saturated hydrocarbons containing 1 to 7 carbon atoms within the chain including, for example, methyl, ethyl, n-propyl, i-propyl, butyl, i-butyl, sec-butyl, t-butyl, pentyl, hexyl and the like.

The compounds of Formula I can be prepared by reacting 2-nitroimidazole with a compound of the formula

wherein $R_7$ is lower alkyl, phenyl-lower alkyl, substituted phenyl-lower alkyl, halo-lower alkyl or amino-lower alkyl and X is a leaving group such as a halogen, tosyl or mesyl, preferably halogen, especially chloro to form esters of the formula

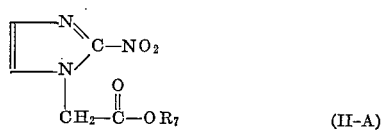

wherein $R_7$ is as above.

The compound of Formula I can be prepared by reacting the ester of Formula II-A with a mono- or di-substituted amine of the formula:

wherein $R_3'$ and $R_4'$ are as above.

Alternatively, the compound of Formula I can be prepared by reacting 2-nitroimidazole with an acetamide of the formula:

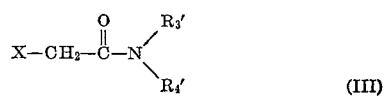

wherein X, $R_3'$ and $R_4'$ are as above.

The reaction of nitroimidazole with a compound of Formula II compound of Formula III is preferably carried out by employing an alkali metal salt of 2-nitroimidazole which can be conveniently prepared by dissolving the 2-nitroimidazole starting material in an alkali metal lower alkoxide, e.g., sodium methoxide, potassium ethoxide, etc. The reactions are suitably carried out in the presence of an inert organic solvent, e.g., N,N-dimethylformamide, N,N-dimethylacetamide, dimethylsulfoxide, lower alkanols, e.g., methanol, ethanol, etc., hydrocarbon solvents, such as toluene, etc., or, if preferred, the reaction, particularly in the case of compounds of Formula III, can be carried out in an aqueous medium, or where one of the reactants is a liquid, the reaction can be carried out in the absence of any solvent. The reaction is suitably carried out at an elevated temperature, preferably in the range of about 90° to about 160°. The reaction of an ester of Formula 11-A with an amine to form the amides of Formula I is suitably carried out in the presence of an inert organic solvent, preferably an alcohol, such as methanol, ethanol and the like, although where the amine reactant is a liquid, it can be conveniently employed as solvent. The reaction is conveniently carried out at room temperature though higher or lower temperatures can also be employed. As a practical matter, the reaction is generally carried out at a temperature in the range of about 0° to about 50°.

Those compounds of Formula I which are basic in character can be converted to their acid addition salts by reacting with pharmaceutically acceptable acid addition salts which are prepared from pharmaceutically acceptable acids such as hydrohalic, sulfuric, phosphoric and the like, organic acids, such as acetic, citric, tartaric and the like.

The novel compounds of Formula I and, where available, their acid addition salts with pharmaceutically acceptable acids are active against bacteria, pathogenic yeasts and protozoa, and are useful as germicides, antiprotozoal agents, and as agents for the treatment of pathogenic yeast infections. More particularly, the compounds of Formula I are useful in the treatment of infectious diseases caused by Trichomonas, e.g., *T vaginalis, T. Foetus*, etc., Histomonas, e.g. *H. malegradis*, etc., Trypaosomes, e.g., *T. cruzi, T. rhodesiense, T. congolense*, etc. They can be administered orally, parenterally topically or in suppository form, e.g., in combination with the usual pharmaceutical adjuvants. Typical oral internal dosage ranges from about 20 to about 200 mg./kg. animal body weight with dosage adjusted to species and individual requirements. Typical formulations are given below.

TABLET FORMULATION

| | Per tablet, mg. |
|---|---|
| Compound of Formula I | 100 |
| Lactose, U.S.P. | 202 |
| Corn starch, U.S.P. | 80 |
| Prehydrolyzed food grade corn starch | 20 |
| Calcium stearate | 8 |
| Total weight | 410 |

PROCEDURE (1) The compound of Formula I, lactose, corn starch, and the prehydrolyzed corn starch were blended in a suitable mixer.

(2) The mixture was granulated to a heavy paste with water and the moist mass was passed through a No. 12 screen. It was then dried overnight at 110° F.

(3) The dried granules were passed through a No. 16 screen and transferred to a suitable mixer. The calcium stearate was added and mixed until uniform.

(4) The mixture was compressed at a tablet weight of 410 mg. using tablet punches having a diameter of approximatel ⅜". (Tablets may be either flat or biconvex and may be scored if desired.)

PARENTERAL FORMULATION (per cc.)

Compound of Formula I—10.2 mg.
Propylene glycol—0.4 cc.
Benzyl alcohol (benzaldehyde free)—0.015 cc.
Ethanol (anhydrous)—0.10 cc.
Sodium benzoate—48.8 mg.
Benzoic acid—1.2 mg.
Water for injection q.s.—1.0 cc.

PROCEDURE (for 10,000 cc.)

(1) The 102 gm. of the compound of Formula I were dissolved in 150 cc. of benzyl alcohol; 4,000 cc. of propylene glycol and 1,000 cc. of ethanol were added.

(2) The 12 gm. of benzoic acid were dissolved in the above. The 488 gm. of sodium benzoate dissolved in 3,000 cc. of water for injection were added. The solution was brought up to final volume of 10,000 cc. with water for injection.

(3) The solution was filtered through an 02 Selas candle, filled into suitable size ampuls, gassed with $N_2$ and sealed. It was then autoclaved at 10 p.s.i. for 30 minutes.

CAPSULE FORMULATION

| | Per capsule, mg. |
|---|---|
| Compound of Formula I | 100 |
| Lactose | 83 |
| Corn starch | 37 |
| Talc | 5 |
| Total weight | 225 |

PROCEDURE (1) The compound of Formula I, lactose, and corn starch were mixed in a suitable mixer.

(2) The mixture was further blended by passing through a Fitzpatrick Comminuting Machine with a No. 1A screen with knives forward.

(3) The blended powder was returned to the mixer, the talc added and blended thoroughly. The mixture was then filled into No. 4 hard shell gelatin capsules on a Parke Davis capsulating machine.

SUPPOSITORY FORMULATION

| | Per 1.3 gm. suppository, gm. |
|---|---|
| Compound of Formula I | 0.100 |
| Refined synthetic cocoa butter, coconut derived | 1.155 |
| Carnauba wax | 0.045 |

PROCEDURE (1) The cocoa butter and the carnauba wax were melted in a suitable size glass lined container, mixed well and cooled to 45° C.

(2) The compound of Formula I, which had been reduced to a fine powder with no lumps, was added and stirred until completely and uniformly dispersed.

(3) The mixture was poured into suppository molds to yield suppositories having an individual weight of 1.3 gms.

(4) The suppositories were removed from molds and cooled. They were individually wrapped in wax paper for packaging.

TOPICAL CREAM

| | Per 100 gms. cream, gm. |
|---|---|
| Compound of Formula I | 10.2 |
| Stearic acid | 15.0 |
| Mineral oil light | 1.5 |
| Sorbitan monostearate | 2.5 |
| Methyl p-hydroxybenzoate | 0.08 |
| Propyl p-hydroxybenzoate | 0.02 |
| Sorbitol solution N.F | 5.00 |
| Polyoxyethylene sorbitan monostearate | 1.69 |
| Distilled water | 67.5 |

PROCEDURE (1) The stearic acid, mineral oil, sorbitan monostearate and methyl and propyl p-hydroxybenzoates were melted together at approximately 75° C. in a suitable size stainless steel, packeted kettle with agitator.

(2) A suspension of the compound of Formula I in a solution of polyoxyethylene sorbitan monostearate, sorbitol N.F. and distilled water was added to the melted mixture.

(3) The mixture was stirred at 75° C. until uniform, and the temperature was gradually reduced with continuous stirring.

(4) When the temperature reached 48° C., the cream was transferred to storage containers.

(5) The cream was packaged in wax lined, tin tubes (opal glass jars may also be used).

This invention will be more fully understood from the following examples which are intended to illustrate the invention and are not to be construed as limitative thereof. All temperatures are stated in degrees centigrade.

EXAMPLE 1

Preparation of N-methyl-2-nitro-1-imidazoleacetamide

Sublimed 2-nitroimidazole (6.95 g., 61.5 mmoles) was slurried in 45 ml. of N,N-dimethylformamide and 13.9 ml. (61.5 mmoles) of 4.44 N $NaOCH_3$ in methanol was added. Then 7.97 g. (74 mmoles) of N-methylchloroacetamide was added, and the solution was stirred and heated in an open flask. The mixture was faintly cloudy at 80°. It was stirred for 15 minutes at 130–153°. The mixture was cooled, the NaCl filtered and washed with dimethylformamide, and the filtrate plus wash was evaporated to dryness in vacuo (0.1 mm., 50° bath). The solid which remained was ground with 20 ml. of distilled water, filtered, and washed with two 5 ml. portions of water. The slightly moist solid was recrystallized from 110 ml. of boiling water (3 g. of charcoal) to give pale yellow needles of N-methyl-2-nitro-1-imidazoleacetamide, melting point 174–175°.

EXAMPLE 2

Preparation of N-isopropyl-2-nitro-1-imidazoleacetamide

A slurry of 10.0 g. (54 mmoles) of 2-nitro-1-imidazole acetic acid methyl ester in 50 ml. of absolute methanol was stirred and 25 ml. of isopropyl amine was added. The solid completely dissolved and overnight a new solid had formed. The mixture was stirred at room temperature for 26 hours, cooled in the freezer 17 hours and the solid collected, washed with 10 ml. of absolute MeOH and dried. Recrystallized from 75 ml. of boiling absolute EtOH, the product was obtained as fine white needles, M.P., 195–196°.

$\lambda_{max.}^{EtOH}$ 314 m$\mu$, $\epsilon = 8100$

EXAMPLE 3

Preparation of N,N-dimethyl-2-nitro-1-imidazoleacetamide

Fifty milliliters of absolute methanol was cooled in an ice bath and gaseous dimethylamine was bubbled in until the final volume was 125 ml. Then 10 g. (54 mmoles) of 2-nitro-1-imidazoleacetic acid methyl ester was added and the mixture stirred in a stoppered flask. The solid dissolved, and after about 10–15 min. a new solid began to form. The mixture was allowed to stand at room temperature for 24 hours and then cooled in the freezer for 17 hours. The crystals were collected, washed with 2×10 ml. of absolute methanol and dried. Recrystallized from 90 ml. of boiling absolute ethanol (charcoal) the product was obtained as pale yellow flakelet crystals, M.P. 129–130°.

$\lambda_{max.}^{EtOH}$ 314 m$\mu$, $\epsilon = 8400$

EXAMPLE 4

Preparation of N-ethyl-2-nitro-1-imidazoleacetamide 50 milliliters of absolute methanol was cooled in an ice bath and monoethylamine was poured in slowly from a cylinder until the total volume was about 100 ml. Then 10.0 g. (54 mmoles) of 2-nitro-1-imidazoleacetic acid methyl ester was added and the mixture stirred in a stoppered flask. The solid dissolved and after about 10 min. a new solid formed. The mixture was allowed to stand at room temperature for 19 hours and was then placed in the freezer for 4 hours. The crystalline solid was filtered, washed with 10 ml. of methanol and dried. Recrystallized from 75 ml. of boiling absolute ethanol, the product was obtained as crystals melting at 181–182°.

$\lambda_{max.}^{EtOH}$ 313 m$\mu$, $\epsilon = 7700$

EXAMPLE 5

Preparation of N-butyl-2-nitro-1-imidazoleacetamide

A solution of 10.0 g. (54 mmoles) of 2-nitro-1-imidazoleacetic acid methyl ester plus 20 ml. of n-butylamine in 100 ml. of absolute methanol was allowed to stand at room temperature overnight. The solution was evaporated to dryness in vacuo. The resulting solid was recrystallized from 35 ml. of ethyl acetate (charcoal) to give the product melting at 124–125°. (The product softened at 117° and the melting point varied with rate of heating.)

$\lambda_{max.}^{EtOH}$ 312 m$\mu$, $\epsilon = 7600$

EXAMPLE 6

Preparation of N-isobutyl-2-nitro-1-imidazoleacetamide

A solution of 7.00 g. (37.8 mmoles) of 2-nitro-1-imidazole acetic acid methyl ester in 14 ml. of isobutylamine plus 70 ml. methanol was allowed to stand at room temperature for 5 days and evaporated in vacuo to give a yellow solid. Recrystallized once from 65 ml. of absolute ethanol (charcoal) and once from ethyl acetate, the product was obtained as crystals melting at 147.5–148.5°.

$\lambda_{max.}^{iPrOH}$ 312 m$\mu$, $\epsilon = 7500$

EXAMPLE 7

Preparation of N-propyl-2-nitro-1-imidazoleacetamide

A solution of 7.00 g. (37.8 mmoles) of 2-nitro-1-imidazole acetic acid methyl ester and 14 ml. of n-propylamine in 70 ml. of methanol was allowed to stand at room temperature overnight. On cooling, there was obtained crystals melting at 159–160°. Recrystallized from 30 ml. of boiling ethanol (charcoal), the product was obtained as crystals melting at 159–160.5.

$\lambda_{max.}^{iPrOH}$ 313 m$\mu$, $\epsilon = 7600$

EXAMPLE 8

Preparation of N,N-diethyl-2-nitro-1-imidazoleacetamide

A suspension of 10.25 g. (90.5 mmoles) of ground and sieved sublimed 2-nitroimidazole in 100 ml. of dimethylformamide (DMF) was stirred magnetically and 20.2 ml. of 4.44 N NaOCH$_3$ in CH$_3$OH was added. The azomycin dissolved and the solution became pink; addition of a pinch of azomycin gave a yellow solution which was heated to 150° and cooled to 97° and 14.5 ml. (den. 1.10, 16.0 g., 107 mmoles) of N,N-diethylchloroacetamide was added. The temperature fell to 93° and then rose spontaneously at 97° and a precipitate formed. The mixture was heated and stirred at 100–120° for 20 minutes. The DMF was evaporated in vacuo (oil pump) and the gum shaken with water to remove the salt. The oil was then dissolved in acetone and the solution allowed to evaporate in a shallow dish. Crystals formed gradually. After 24 hours, the crystalline product was slurried in 7 ml. of 3:1 vol.:vol. H$_2$O:EtOH, filtered and washed with two times 2.5 ml. of the same solvent mixture and dried. The filtrate plus wash from this material was allowed to evaporate to give a moist solid which was sucked as dry as feasible on a Büchner and slurried on the Büchner in 4 ml. and then 3 ml. of cold 3:1 vol.:vol. H$_2$O:EtOH and dried. Recrystallized from 33 ml. of warm 3:1 vol.:vol. H$_2$O:EtOH gave the product as crystals melting at 42–44°. Upon slow evaporation of the filtrate from the first crop, chunky crystals melting at 60–62.5° were obtained. The I.R. spectra of chloroform solutions of these differently melting crystals were identical, indicating different crystal forms.

$\lambda_{max.}^{EtOH}$ 314 m$\mu$, $\epsilon = 8300$

EXAMPLE 9

Preparation of N-tert-butyl-2-nitro-1-imidazoleacetamide

A solution of 7.00 g. (61.9 mmoles) of 2-nitroimidazole in 70 ml. of dimethylformamide (DMF) plus 13.7 ml. of 4.52 N NaOCH$_3$ in CH$_3$OH was heated to 152° and cooled to 100° and 9.30 g. (62.1 mmoles) of N-tert-butylchloroacetamide was added. The mixture was stirred at 85–100° for 40 minutes, (UV, $\lambda_{max.}^{0.1 N\ NaOH}$ 326 m$\mu$ indicated complete reaction), and then evaporated to dryness in vacuo (oil pump). The residue was extracted with 100 ml. of acetone and the solid filtered and washed thoroughly with acetone. The acetone filtrate was treated with Norit A, filtered, and evaporated to dryness in vacuo. The resulting solid was recrystallized from 35 ml. of ethyl acetate (1 g. Norit A) to give the product as a solid melting at 209.5–211°.

$\lambda_{max.}^{iPrOH}$ 313 m$\mu$, $\epsilon = 7100$

EXAMPLE 10

Preparation of 2-nitro-1-imidazoleacetic acid methyl ester

To a slurry of 100 g. (885 mmoles) of powdered sublimed 2-nitroimidazole in 500 ml. of N,N-dimethylformamide was added 200 ml. of 4.44 N NaOCH$_3$ in CH$_3$OH. The solution became pink and just enough 2-nitroimidazole was added to give a yellow solution. The solution was heated to 153° in an open flask to remove methanol, cooled to 90° and 135 ml. (166 g., 1.53 moles) of methylchloro acetate added. The temperature spontaneously rose to 122° and then fell with formation of a precipitate. The mixture was heated at 105–115° for 15 minutes and the solvent removed in vacuo (0.2 mm., bath 50°) to give an oil. To the oil was added 500 ml. of reagent acetone. The product dissolved and salt which precipitated out was removed by filtration. The acetone solution was evaporated in vacuo to give a tan solid which was slurried in 200 ml. of ethanol, filtered, washed with 50 ml. of ethanol and dried. This dried solid was recrystallized from 350 ml. boiling ethanol (12 g. Norit A) to give pale yellow flakelets melting at 94–95°.

$\lambda_{max.}^{EtOH}$ 311 m$\mu$, $\epsilon = 7700$

EXAMPLE 11

Preparation of 2-nitro-1-imidazoleacetic acid

A solution of 20.0 g. (108 mmoles) of 2-nitro-1-imidazoleacetic acid methyl ester in 1200 ml. of 0.1 N NaOH was refluxed for 15 minutes. The solution was cooled, acidified to pH 1.7 by the addition of 120 ml. of 1 N HCl, and extracted with 3×1 l. of ethyl acetate. The combined ethyl acetate extracts were dried over anhydrous MgSO$_4$ and concentrated in vacuo to 600 ml. whereupon a solid formed. The slurry was refrigerated overnight, and the off white solid was collected, washed with ethylacetate and dried to give the product as a solid melting at 159–160° (explodes, the decomposition point depends upon the rate of heating).

$\lambda_{max.}^{EtOH}$ 312 m$\mu$, $\epsilon = 7700$

The material was partly destroyed upon recrystallization from boiling ethylacetate or boiling acetone giving an appreciably darker material having a melting point of 146° (explodes).

EXAMPLE 12

Preparation of 2-nitro-1-imidazoleacetamide

Sublimed 2-nitroimidazole (1.00 g., 8.85 mmoles) was dissolved in 8.7 ml. of 1 N aqueous sodium hydroxide solution. There was added 1.24 g. (13.3 mmoles) of chloroacetamide, and the mixture was refluxed for 1.5 hrs. The reaction mixture was allowed to cool to room temperature, and the crystals which formed were collected, slurried with 3 to 4 ml. of 1 N sodium hydroxide solution, filtered, washed with 1 N sodium hydroxide and then with distilled water and dried. After recrystallizing twice from 5 ml. of boiling distilled water, there was obtained crystalline 2-nitro-1-imidazoleacetamide of melting point 182–183.5° having an I.R. spectrum identical to that of the material prepared by using dimethylformamide as solvent.

EXAMPLE 13

Preparation of N-methyl-2-(4,5-dimethyl-2-nitro-1-imidazolyl) acetamide

A solution of 2.39 g. (17.6 mmoles) of 4,5-dimethyl-2-nitroimidazole in 4 ml. of 4.44 N NaOCH$_3$ in CH$_3$OH was evaporated in vacuo to a solid which was dissolved in 25 ml. of dimethylformamide along with 2.38 g. (22.2 mmoles) of N-methylchloroacetamide. The solution was refluxed for 15 min. and the solvent removed in vacuo. The tacky solid was dissolved in 160 ml. of distilled water plus 17 ml. of 1 N NaOH and the solution passed through a Dowex 1-X4 (acetate) column 2.4 x 20 cm., 100–200 mesh and eluted with distilled water. This permitted separation of the product from the starting material. The fractions possessing $\lambda_{max.}^{0.1\ N\ NaOH}$ 369 m$\mu$ were evaporated to a tacky solid, dissolved twice in absolute ethanol and reconcentrated. The resulting material was extracted with ethylacetate and the ethylacetate evaporated. The resulting solid was recrystallized from 40 ml. of hot CHCl$_3$ to give crystals melting at 166–169° and recrystallized a second time from 20 ml. of CHCl$_3$ to give the product as crystals melting at 170–172°.

$\lambda_{max.}^{0.1\ N\ HCl}$ 368 m$\mu$, $\epsilon = 11,700$

EXAMPLE 14

Preparation of 4,5-dibromo-2-nitroimidazole

Ten grams (88.5 mmoles) of ground and sieved sublimed 2-nitroimidazole was dissolved in 270 ml. of 1 N NaOH solution; the solution was cooled in an ice bath, stirred magnetically, and 10.0 ml. (den. 2.93, 29.3 g., 184 mmoles) of bromine was added dropwise. The color of the bromine bleached gradually and a precipitate formed toward the end of the addition. The final solution bleached pH paper and was acid to litmus. Cooling and stirring were continued for 20 min. and the solid was filtered, washed with 3 times 10 ml. of distilled water, dried and recrystallized twice from 40 parts of boiling distilled water (charcoal) to give chunky yellow crystals of 4,5-dibromo-2-nitroimidazole, M.P. 136.5–137° dec.

$\lambda_{max.}^{0.1\ N\ NaOH}$ 385 m$\mu$, $\epsilon = 13,500$

What is claimed is:

1. A compound according to claim 9 of the formula

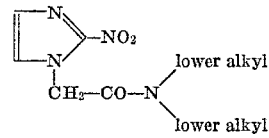

2. The compound according to claim 1 wherein the lower alkyl groups are each methyl, i.e., the compound N,N-dimethyl-2-nitro-1-imidazole acetamide.

3. The compound according to claim 1 wherein the lower alkyl groups are each ethyl, i.e., the compound N,N-diethyl-2-nitro-1-imidazole acetamide.

4. A compound according to claim 9

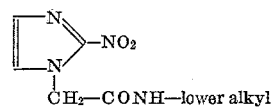

5. The compound according to claim 4 wherein the lower alkyl group is ethyl, i.e., the compound N-ethyl-2-nitro-1-imidazole acetamide.

6. The compound according to claim 4 wherein the lower alkyl group is propyl, i.e., the compound N-propyl-2-nitro-1-imidazole acetamide.

7. The compound according to claim 4 wherein the lower alkyl group is isopropyl, i.e., the compound N-isopropyl-2-nitro-1-imidazole acetamide.

8. The compound according to claim 4 wherein the lower alkyl group is butyl, i.e., the compound N-butyl-2-nitro-1-imidazole acetamide.

9. A compound of the formula:

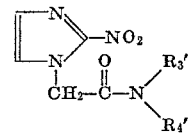

wherein R$_3'$ is hydrogen or lower alkyl, and R$_4'$ is lower alkyl.

References Cited

May & Baker Ltd., Chemical Abstracts vol. 62, page 9145 C (1965).

ALEX MAZEL, Primary Examiner

J. TOVAR, Assistant Examiner

U.S. Cl. X.R.

424—269